United States Patent
Kojima

(10) Patent No.: US 6,464,213 B1
(45) Date of Patent: Oct. 15, 2002

(54) VIBRATION ISOLATING APPARATUS

(75) Inventor: Hiroshi Kojima, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/466,876

(22) Filed: Dec. 20, 1999

(30) Foreign Application Priority Data

Dec. 24, 1998 (JP) .......................................... 10-367610
Apr. 27, 1999 (JP) .......................................... 11-119935

(51) Int. Cl.$^7$ .............................. F16F 5/00; F16F 9/00; F16F 15/00
(52) U.S. Cl. ............................ 267/140.14; 267/140.15; 188/267
(58) Field of Search ....................... 267/140.14, 140.15; 188/267

(56) References Cited

U.S. PATENT DOCUMENTS

| 4,624,435 A | * 11/1986 | Freudenberg ............... 188/267 |
| 4,669,711 A | * 6/1987 | Beer ...................... 267/140.14 |
| 4,725,046 A | * 2/1988 | Sugino .................... 267/140.14 |
| 5,219,037 A | * 6/1993 | Smith et al. ............ 267/140.13 |
| 5,275,388 A | * 1/1994 | Kobayashi et al. ..... 267/140.14 |
| 5,333,846 A | * 8/1994 | Gotto et al. ........... 267/140.14 |

FOREIGN PATENT DOCUMENTS

DE 2927757 A1 * 2/1981

* cited by examiner

Primary Examiner—Jack Lavinder
Assistant Examiner—Robert A. Siconolfi
(74) Attorney, Agent, or Firm—Oliff & Berridge, PLC

(57) ABSTRACT

In the vibration isolating apparatus of the present invention, a controller provides drive current to an electromagnet when shaking vibration is being generated. This causes an intermediate plate to be attracted to the electromagnet thereby preventing elastic deformation of a first elastic piece caused by load transmitted from a top plate. Therefore, the static spring constant of an elastic body can be made larger than when the electromagnet is not being operated. Furthermore, the controller shuts off the supply of drive current to the electromagnet when idling vibration is being generated. This causes the intermediate plate to move away from the electromagnet thereby enabling elastic deformation of the first elastic piece cause by the load transmitted from the top plate. Therefore, the static spring constant of the elastic body can be made smaller than when the electromagnet is operated. The result of this is that, according to the vibration isolating apparatus of the present invention, the static spring constant of an elastic body to counter vertical load and the static spring constant of an elastic body to counter shear load can both be adjusted to optimum values in accordance with the characteristics of the input vibration.

5 Claims, 4 Drawing Sheets

VIBRATION ISOLATING APPARATUS

BACKGROUND OF THE INVENTION

1. Field of the Invention

The present invention relates to a vibration isolating apparatus for suppressing vibration transmitted from a vibration generating portion such as an engine or the like to a vibration receiving portion such as a vehicle body or the like, which is applicable to automobiles, construction machinery, general industrial machinery, and the like.

2. Description of the Related Art

A vibration isolating apparatus is provided between the engine of a vehicle which is a vibration generating portion and the vehicle body which is a vibration receiving portion. The vibration isolating apparatus is constructed so as to absorb vibration generated by the engine and thereby suppress the amount of vibration transmitted to the vehicle body. Vibration from the engine can here generally be considered to be a compound of pitch, which is vibration substantially in the vertical direction, and roll, which is vibration substantially in the horizontal direction. The amplitude and frequency of both the pitch and roll change according to the number of engine revolutions, the size of the engine load, and the like. Moreover, the amplitude and frequency of the vibration transmitted from the engine change according to changes in the number of engine revolutions, namely, according to changes in the vehicle running speed. Specifically, when a vehicle is travelling at between 70–80 km/h, shaking vibration in a comparatively low frequency range (less than 15 Hz) is generated. Alternatively, when the vehicle is idling or is travelling at less than 5 km/h, idling vibration in a comparatively high frequency range (20–40 Hz) is generated. Therefore, when considering the vibration absorbing performance of a vibration isolating apparatus, when shaking vibration is being generated, a high spring constant relative to the input vibration is able to effectively absorb the shaking vibration. When idling vibration is being generated, a low spring constant relative to the input vibration is able to effectively absorb the idling vibration.

Known examples of vibration isolating apparatuses used as engine mounts include hydraulic types having a rubber elastic body, a pressure receiving fluid compartment, and a plurality of fluid sub-compartments in which the pressure receiving fluid compartment and fluid sub-compartments are connected to each other by restricting passages each having a different length and cross-sectional area. In this type of vibration isolating apparatus, the aims are that vibration be absorbed by the fluid resonance and the like of the fluid present in the restricting passage and to reduce the dynamic spring constant (dynamic stiffness) relative to the vibration in each frequency range by switching which fluid sub-compartment is connected to the pressure receiving fluid compartment according to the frequency range of the input vibration.

However, in a hydraulic-type vibration isolating apparatus, when the fluid sub-compartment connected to the pressure receiving fluid compartment is switched according to the frequency range of the input vibration, it is possible to effectively reduce the dynamic spring constant relative to the pitch acting mainly as a vertical load on the elastic body. However, has not been possible to sufficiently reduce the dynamic spring constant relative to the roll acting mainly as a shear load on the elastic body. Therefore, in a hydraulic type vibration isolating apparatus, normally the static spring constant in the direction of the shear load of the elastic body is set at a somewhat high level so that the shaking vibration can be effectively absorbed. Because of this, when conventional hydraulic vibration isolating apparatuses have been used as engine mounts, they have not always been able to sufficiently absorb the roll when idling vibration is generated.

In consideration of the above, the aim of the present invention is to provide a vibration isolating apparatus capable of adjusting both a static spring constant relative to the vertical load of an elastic body and a static spring constant relative to the shear load of the elastic body to suitable values according to the characteristics of the input vibration.

SUMMARY OF THE INVENTION

The first aspect of the present invention is a vibration isolating apparatus comprising: a first mounting member connected to one of a vibration generating portion and a vibration receiving portion; a second mounting member connected to the other one of the vibration generating portion and the vibration receiving portion; an elastic body capable of elastic deformation which is provided between the first mounting member and the second mounting member; an intermediate plate for partitioning the elastic body into a first elastic piece and a second elastic piece cross-sectionally relative to a vertical load from the first mounting member or second mounting member; and restraining means provided together with the first elastic piece between the first mounting member and the intermediate plate, which restrains movement of the intermediate plate relative to the first mounting means when operated, and allows movement of the intermediate plate relative to the first mounting means when not operated.

According to this vibration isolating apparatus, an intermediate plate partitions an elastic body into a first elastic piece and a second elastic piece cross-sectionally relative to a vertical load applied from a first mounting member or a second mounting member. The restraining means prevents movement of the intermediate plate relative to the first mounting member when operated, and allows movement of the intermediate plate relative to the first mounting means when not operated. Thus elastic deformation of the first elastic piece is prevented when the restraining means is operated, and elastic deformation of the first elastic piece caused by the load transmitted from the first mounting member or the second mounting member is allowed when the restraining means is operated.

As a result, when the restraining means is operated, only the second elastic piece is able to elastically deform and function as a main absorption body. Therefore, the static spring constants of the elastic body relative to the vertical load and shear load transmitted from the first mounting member or the second mounting member are each able to be made larger than when the restricting means is not being operated. Moreover, when the restraining means is not operated, both the first elastic piece and the second elastic piece become elastically deformable and function as two main absorption bodies arranged serially to each other. Therefore, the static spring constants of the elastic body relative to the vertical load and shear load transmitted from the first mounting member or the second mounting member are each able to be made smaller than when the restraining means is being operated.

The term "vertical load" used here refers to a load which generates a deformation by compressing an elastic body or a deformation by stretching the elastic body. The term "shear load" used here refers to a load which generates shear stress relative to the vertical load in the first elastic piece and second elastic piece.

The second aspect of the vibration isolating apparatus of the present invention is a vibration isolating apparatus according to the first aspect of the present invention further having a pressure receiving fluid compartment provided between the second mounting member and the intermediate plate, at least a portion of the interior wall of the pressure receiving fluid compartment being formed by the second elastic piece, wherein the content volume of the pressure receiving fluid compartment is changed by elastic deformation of the second elastic piece, the vibration isolating apparatus also having a fluid sub-compartment connected to the pressure receiving fluid compartment by a restricting passage.

According to this vibration isolating device, the pressure receiving fluid chamber is made to expand and contract by the deformation of the second elastic piece. Moreover, the fluid in the pressure receiving fluid compartment and the fluid sub-compartment travels reciprocally between the two compartments via the restricting passage. Accordingly, vibration isolation can be improved by the vibration damping action arising from changes in the pressure of the fluid, viscous resistance to the fluid flow, the fluid resonance, and the like generated by the through holes.

The third aspect of the vibration isolating means of the present invention is a vibration isolating apparatus according to the first or second aspects of the present invention, wherein the restraining means has an electromagnet which is fixed to one of the first mounting member and the intermediate plate and, when drive current is supplied to the electromagnet, the electromagnet attracts the other one of the first mounting member and intermediate plate which are formed from a magnetic substance.

According to the this vibration isolating apparatus, an electro magnet is fixed to one of the first mounting member and the intermediate plate, and drive current is supplied to this electromagnet. This causes the other one of the first mounting member and the intermediate plate to be attracted to the electromagnet by the magnetic force from the electromagnet. As a result, when drive current is supplied, the intermediate plate can be prevented from moving relatively to the first mounting member. Moreover, when the supply of drive current is halted, the intermediate plate is released from its state of being restrained by the electromagnet and is able to move relatively to the first mounting member.

The fourth aspect of the vibration isolating apparatus of the present invention is a vibration isolating apparatus according to any of the first through third aspects of the present invention, wherein the restraining means is fixed to one of the first mounting member and the intermediate plate, and is press-contacted to the other one of the first mounting member and the intermediate plate when in operation and separated from the other one of the first mounting member and the intermediate plate when not in operation so as to form a clearance larger than the amplitude of the idling vibration of the vehicle.

According to this vibration isolating apparatus, the restraining means which is fixed to one of the first mounting member and the intermediate plate is press-contacted to the other of the first mounting member and intermediate plate when in operation. Consequently, when in operation, because the intermediate plate is fastened to the first mounting member by the connection with the restraining means, the intermediate plate can be prevented from moving relatively to the first mounting member.

Furthermore, because the restraining means forms a clearance larger than the amplitude of the idling vibration when separated from the other one of the first mounting member and the intermediate plate when the restraining means is not in operation, the intermediate plate is released from its state of being restrained by the restraining means so as to become able to move relatively to the first mounting member. At the same time, the restraining means does not interfere with (touch the top of) the intermediate plate even when idling vibration is input into the first mounting member.

The fifth aspect of the vibration isolating apparatus of the present invention is a vibration isolating apparatus according to any of the first to fourth aspects of the present invention, wherein the first elastic piece is a rubber elastic body.

According to this vibration isolating apparatus, rubber used as an elastic body has excellent resistance to chemicals and is lighter in weight than other materials. Therefore, deterioration of the first elastic piece through corrosion and the like can be suppressed and the apparatus can be made more lightweight.

The sixth aspect of the vibration isolating apparatus of the present invention is a vibration isolating apparatus according to any of the first to fourth aspects of the present invention, wherein the first elastic piece is a metal spring.

According to this vibration isolating apparatus, a metal spring used as an elastic body has excellent heat resistance. Therefore, even if used for long periods in a high temperature environment, deterioration of the first elastic piece cause by heat can be suppressed. Moreover, drops in performance due to reductions in the spring constant, changes in the free length, and the like caused by heat deterioration of the first elastic piece can be prevented.

The seventh aspect of the vibration isolating apparatus of the present invention is a vibration isolating apparatus comprising: a first elastic piece at one end of which is provided a first mounting member which is connected with a vibration generating portion; a second elastic piece at one end of which is provided a second mounting member connected with a vibration receiving portion, and at another end of which is connected the other end of the first elastic piece; and restraining means which, when operated, renders one of the first elastic piece and the second elastic piece incapable of elastic deformation.

The eighth aspect of the vibration isolating apparatus of the present invention is a vibration isolating apparatus according to the seventh aspect of the present invention in which the restraining means comprises an intermediate plate disposed between the first elastic piece and the second elastic piece, and attracting means provided in a fixed manner inside one of the first elastic piece and the second elastic piece, wherein the attracting means, when operated, attracts the intermediate plate or one of the first and second elastic pieces, each of which is provided in isolation from the attracting means.

The ninth aspect of the vibration isolating means of the present invention is a vibration isolating means according to the eighth aspect of the present invention, wherein the attracting means is fixed to the intermediate plate or to one of the first and second elastic pieces, and when operated, is supplied with drive current and driven.

The tenth aspect of the vibration isolating apparatus of the present invention is the vibration isolating apparatus according to the eighth or ninth aspects of the present invention, wherein the one of the first elastic piece and the second elastic piece inside which the attracting means is provided is a rubber elastic body or a metal spring.

The eleventh aspect of the vibration isolating apparatus of the present invention is the vibration isolating apparatus according to any of the eighth to tenth aspects of the present invention, wherein the distance separating the attracting means from either the intermediate plate or one of the first elastic piece and second elastic piece is greater than an amplitude of the idling vibration of the vehicle.

The twelfth aspect of the vibration isolating apparatus of the present invention is the vibration isolating apparatus according to any of the seventh to eleventh aspects of the present invention, further comprising a pressure receiving fluid compartment formed inside the second elastic piece, whose content volume is changed by elastic deformation of the second elastic piece, and a fluid sub-compartment whose content volume also changes and which is connected to the pressure receiving fluid compartment by a restricting passage.

DESCRIPTION OF THE PREFERRED EMBODIMENTS

The vibration isolating apparatus according to the embodiments of the present invention will now be explained with reference to the drawings.

(First Embodiment)

Figure 1:
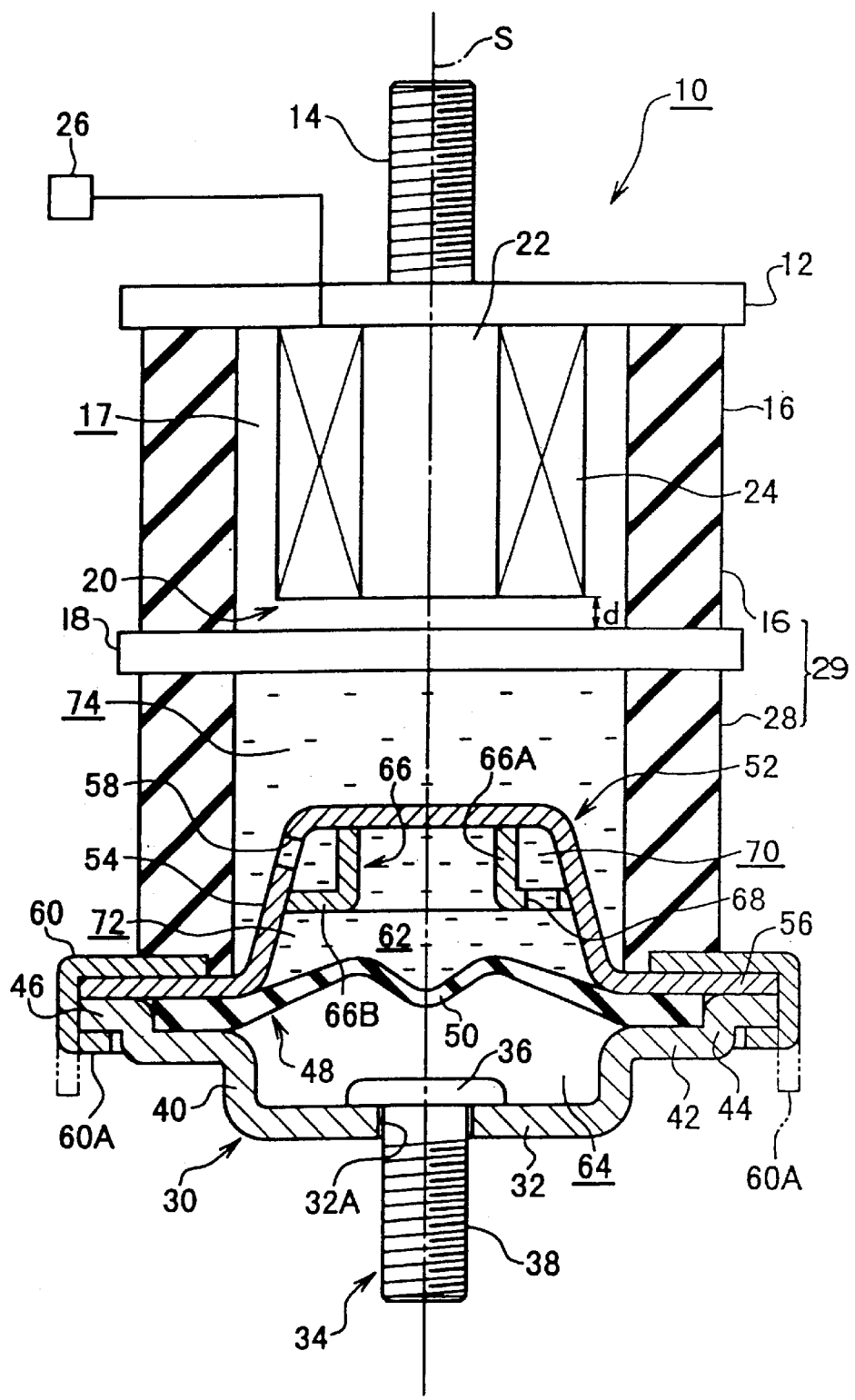
FIG. 1 is a cross sectional view along an axial direction showing a state in which an electromagnet in the vibration isolating apparatus according to the first embodiment of the present invention is not being operated.
Figure 2:
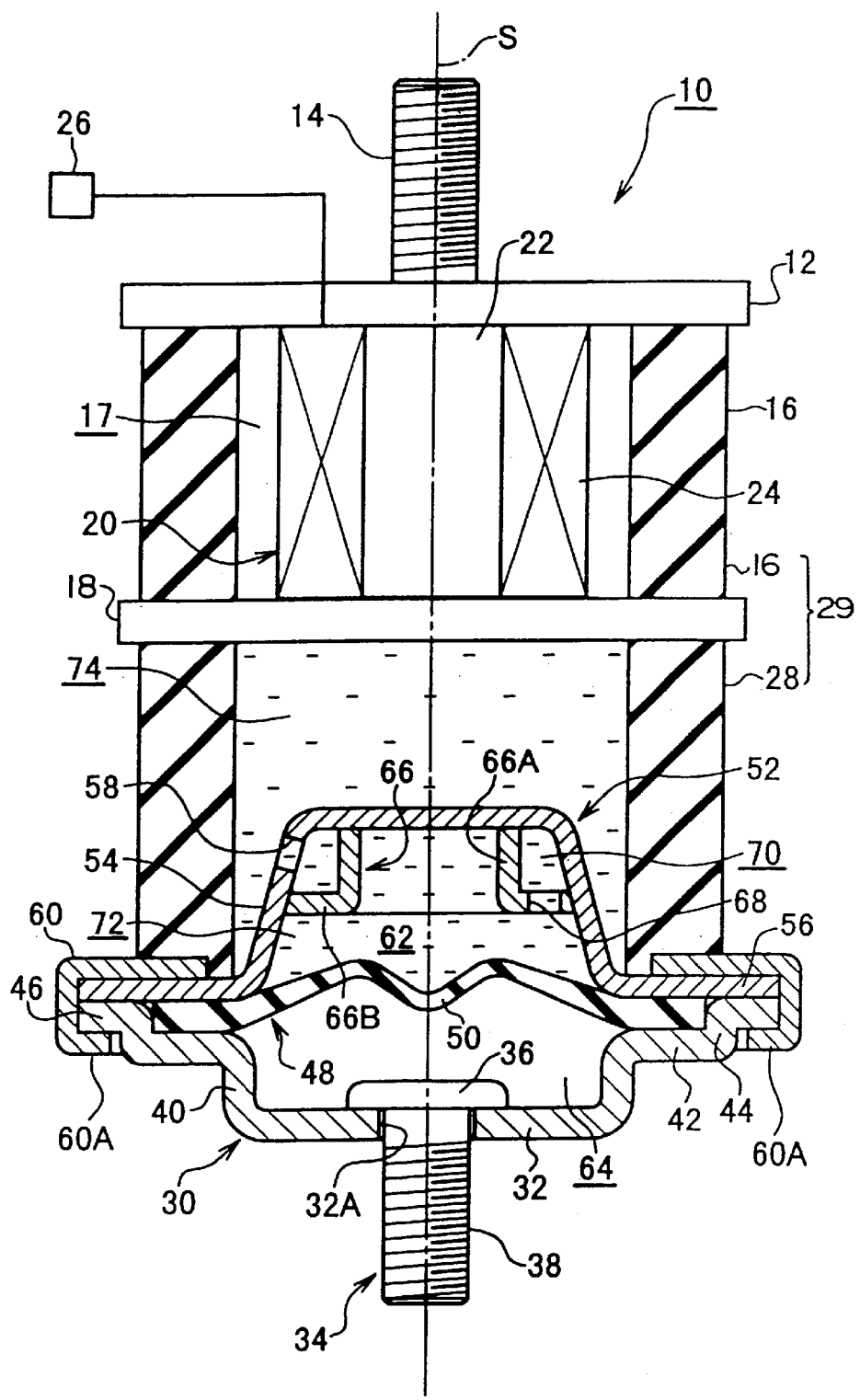
FIG. 2 is a cross sectional view along an axial direction showing a state in which an electromagnet in the vibration isolating apparatus according to the first embodiment of the present invention is being operated.

FIGS. 1 and 2 show a vibration isolating apparatus according to the first embodiment of the present invention. The symbol S in the figure indicates the axial center of the apparatus. The description given below takes the direction of this axial center S as the axial direction of the apparatus.

A thick, flat top plate 12 is provided at the top edge portion of the vibration isolating apparatus 10, as is shown in FIG. 1. A bolt shaft 14 protrudes upwards from the top surface of the top plate 12 along the axial center S. An unillustrated engine, which is a vibration generating portion of a vehicle, is mounted on the top plate 12. This engine is firmly fastened to the top plate 12 by the bolt shaft 14. The top end surface of a rubber first elastic piece 16, formed as a thickly-walled, hollow cylinder, is adhered by vulcanization to the bottom surface of the top plate 12.

A thick, flat intermediate plate 18 formed from magnetic material able to be attracted by the magnetic force of iron or the like is provided at the underside of the first elastic piece 16. The bottom end surface of the first elastic piece 16 is adhered by vulcanization to the top surface of the intermediate plate 18. A cylindrical hollow portion 17 is formed in the inner peripheral side of the first rubber piece 16. The openings at the top end and bottom end of the hollow portion 17 are closed by the top plate 12 and the intermediate plate 18, respectively.

An electromagnet 20 is provided inside the hollow portion 17 of the first rubber piece 16, as is shown in FIG. 1. The electromagnet 20 comprises a core 22 formed from iron substantially in the shape of a solid cylinder and a coil 24. The coil 24 is formed substantially in the shape of a hollow cylinder and is disposed so as to completely surround the outer peripheral surface of the core 22. The electromagnet 20 is disposed so that the axial center of the core 22 is identical with the axial center S of the apparatus. The upper end surface of the electromagnet 20 is fixed to the bottom surface of the top plate 12. When no vibration is being input from the outside (the state shown in FIG. 1), the measurements in the axial direction are set so that the distance from the bottom surface of the electromagnet 20 to the top surface of the intermediate plate 18 is a predetermined initial clearance d.

A controller 26 is provided outside the main body of the apparatus as a means for controlling the electromagnet 20. The controller 26 is connected to the coil 24. Therefore, the electromagnet 20 can apply a magnetic force to the intermediate plate 18 in accordance with a drive current supplied from the controller 26 to the coil 24. In this case, the controller 26 operates using the vehicle power source. The controller 26 detects the speed of the engine revolutions based on a crank signal from a sensor for detecting the crank phase of the engine. As a result, the controller 26 is able to determine in a predetermined detecting cycle whether idling vibration is being generated or shaking vibration is being generated.

The top end surface of a rubber second elastic piece 28, formed as a thickly-walled, hollow cylinder, is adhered by vulcanization to the bottom surface of the intermediate plate 18. The second elastic piece 28 and the first elastic piece 16 together form an elastic body 29 as a main vibration absorbing body. A bottom plate 30 is provided beneath the second elastic piece 28. The bottom plate 30 has a circular plate-shaped bottom portion 32 on the internal periphery thereof. A through hole 32A is formed in the central portion of the bottom portion 32 in the direction of the axial center S. A bolt 34 is inserted from above through the through hole 32A. The head portion of the bolt 36 is fixed by welding or the like to the bottom plate 30. Therefore, the bolt shaft 38 protrudes downwards from the bottom surface of the bottom plate 30 in line with the axial center S. The bottom plate 30 is then placed on the vehicle body, which is the vibration receiving portion, and is firmly fastened to the vehicle body by the bolt shaft 38.

An inner peripheral wall portion 40, bent upwards at a right angle from around the outer edge of the bottom portion 32, is formed in the bottom plate 30. A ring-shaped inner peripheral flange portion 42, bent so as to be substantially parallel with the bottom portion 32, extends from the top edge of the inner peripheral wall portion 40. An outer peripheral wall portion 44, bent upwards at a right angle from around the outer edge of the inner peripheral flange portion 42, is further formed in the bottom plate 30. A ring-shaped outer peripheral flange portion 46, bent so as to be substantially parallel with the bottom portion 32, extends from the top edge of the outer peripheral wall portion 44.

The peripheral edge portion of a diaphragm 48 is placed on the inner peripheral flange portion 42 of the bottom plate 30, as is shown in FIG. 1. The diaphragm 48 is formed in a taper shape in which the inner peripheral portion protrudes upwards higher than the peripheral edge portion. A reversed portion 50 is formed in the top portion of the diaphragm 48 in a downwards projecting hollow cone shape. The bottom surface of the reversed portion 50 faces the top surface of the bolt head portion 36 fixed to the bottom portion 32 of the bottom plate 30. Accordingly, even when an excessive load is input from the plate 12 and the diaphragm 48 collides with the bolt head portion 36, the shock from the collision is tempered by the reversed portion 50, thus preventing the diaphragm 48 from suffering any damage in the long term. Moreover, the diaphragm 48 is thickest in its peripheral edge portion and the thickness gradually decreases moving from the peripheral edge portion towards the center.

A partition wall member 52 which sandwiches the diaphragm 48 is placed on the bottom plate 30, as is shown in FIG. 1. A partition wall portion 54 is formed substantially in a cup shape with the top side closed and the bottom side open on the inner peripheral side of the partition wall member 52. The outer peripheral surface of the partition wall portion 54 is formed in a taper shape whose outer diameter becomes gradually smaller moving from the bottom side towards the top side. A ring-shaped flange portion 56 extends in a radial direction around the axial center S from the bottom end portion of the partition wall portion 54. The partition wall member 52 has an outer diameter equal to that of the bottom plate 30. The width of the flange portion 56 in the radial direction is made substantially equal to the width of the bottom plate 30 from the inner peripheral edge of the inner peripheral flange portion 42 to the outer peripheral edge of the outer peripheral flange portion 46. A through hole 58 is formed in the vicinity of the top end of the partition wall portion 54 penetrating from the outer surface to the inner surface thereof.

When the partition wall member 52 is placed on the bottom plate 30, the outer peripheral side of the flange portion 56 of the partition wall member 52 is in seamless contact with the outer peripheral flange portion 46 of the bottom plate 30. Moreover, peripheral edge portion of the diaphragm 48 is sandwiched between the inner peripheral portion of the of the flange portion 56 of the partition wall member 52 and the inner peripheral flange portion 42 of the bottom plate 30. At this time, the gap in the axial direction between the flange portion 56 and the inner peripheral flange portion 42 is made thinner than the thickness of the peripheral edge portion of the diaphragm 48.

The flange portions 46 and 56 of the bottom plate 30 and partition wall member 52 respectively are sandwiched in the axial direction by a fastening metal fitting 60 whose cross section is formed substantially in a U shape and are crimped tightly together. Before crimping, the fastening metal fitting 60 is formed as is shown by the double dot dash line in FIG. 1 with an L-shaped cross section. At this time, the crimping portion 60A on the bottom end of the fastening metal fitting 60 is not bent towards the axial center S. After the L-shaped portion of the fastening metal fitting 60 has been placed over the bottom plate 30 and the partition wall member 52 so that the partition wall member 52 is in seamless contact with the top surface of the outer peripheral flange portion 46, the crimping portion 60a is bent towards the axial center S as is shown by the solid line in FIG. 1. Accordingly, the flange portions 46 and 56 are tightly adhered to each other by being crimped tightly together by the fastening metal fitting 60. Moreover, the inner peripheral surface of the fastening metal fitting 60 abuts the entire outer peripheral surfaces of the flange portions 46 and 56. This prevents the bottom plate 30 and the partition wall member 52 from being mispositioned relative to each other in the radial direction.

By firmly fastening the flange portions 46 and 56 so that they are tightly adhered to each other, the peripheral edge portion of the diaphragm 48 is sandwiched in a compressed state by the flange portions 42 and 56, and is thus fixed between the inner peripheral flange portion 42 and the flange portion 56. The bottom end of the partition wall portion 54 is thus closed off by the diaphragm 48 forming a space inside the partition wall portion 54 partitioned off from the outside, which space becomes a fluid compartment space 62. Moreover, the top end of the inner peripheral wall portion 40, whose bottom end is closed off by the bottom portion 32, is closed off by the diaphragm 48. An air compartment 64 is thus formed within the inner peripheral wall portion 40 which is partitioned by the diaphragm 48 from the adjacent fluid compartment space 62. Where necessary, an air hole communicating with the outside may be formed in the bottom portion 32 or the inner peripheral wall portion 40.

A passage forming member 66 is formed substantially as a hollow cylinder within the fluid compartment space 62. The passage forming member 66 comprises a hollow cylinder portion 66A and a ring-shaped flange portion 66B which extends outwards in a radial direction from the bottom edge portion of the hollow cylinder portion 66A. The cross section of the passage forming member in the axial direction is thus formed in an L shape. A through hole 68 is also formed in the flange portion 66B in line with the axial direction. The surface of the top edge of the hollow cylinder portion 66A and the surface of the outer peripheral edge of the flange portion 66B of the passage forming member provided inside the fluid compartment space 62 are seamlessly fixed by welding or the like to the partition wall portion 54. A ring-shaped restricting passage 70 is thus formed within the fluid compartment space 62 on the inner side of the passage forming member 66. The space outside the through hole 68 in the fluid compartment space 62 is a fluid sub-compartment 72.

The bottom end surface of the second elastic piece 28 is adhered by vulcanization to an area extending from the inner peripheral side of the top surface of the fastening metal fitting 60 to the inner peripheral edge of the top surface of the outer peripheral flange portion 46. Therefore, the bottom end of the second elastic piece 28 is closed off by the fastening metal fitting 60 and the outer peripheral flange portion 46. A pressure receiving fluid compartment 74 isolated from the outside is thus formed within the second elastic piece 28. The partition wall portion 54 inside which are formed the restricting passage 70 and the fluid sub-compartment 72 protrudes into the pressure receiving fluid compartment 74. The pressure receiving fluid compartment 74 communicates with the fluid sub-compartment 72 via the through hole 58, the restricting passage 70, and the through hole 68.

The pressure receiving fluid compartment 74, the restricting passage 70, and the fluid sub-compartment 72 of the vibration isolating apparatus assembled in the above described manner are filled with a fluid such as water, oil, ethylene glycol, or the like.

Next, the operation of the vibration isolating apparatus 10 of the present embodiment is explained.

When a vehicle is travelling at, for example, 70–80 km/h, shaking vibration (less than 15 Hz) is generated. When the engine of the vehicle is idling or when the vehicle is travelling 5 km/h or less, idling vibration (20–40 Hz) is generated. On the basis of the crank signal, the controller 26 makes determinations in a fixed cycle while the engine is being operated as to whether idling vibration or shaking vibration is being generated.

If the controller 26 determines that idling vibration is being generated in which the vibration from the engine is in a comparatively high frequency range, the supply of drive current to the electromagnet 20 is shut off. In this case, the gap between the bottom surface of the electromagnet 20 and the top surface of the intermediate plate 18 is set to the initial clearance d when the initial load generated by the weight of the engine itself and so on is received.

The initial clearance d is set, based on the amplitude of the idling vibration and the static spring constant in the axial direction of the first elastic piece 16, so that the bottom surface of the electromagnet 20 and the top surface of the intermediate plate 18 do not come into contact with each other when idling vibration is being input. Generally, because the amplitude of the idling vibration is extremely small, the initial clearance d can be set to approximately a few millimeters. Therefore, elastic deformation in both the first elastic piece 16 and the second elastic piece 28 due to the load transmitted from the top plate 12 when the electromagnet 20 is stopped is possible.

Furthermore, if the controller 26 determines that shaking vibration is being generated in which the vibration from the engine is in a comparatively low frequency range, drive current is supplied to the coil 24 of the electromagnet 20. The electromagnet 20 then generates magnetic force and the first elastic piece 16 is deformed by being compressed in the axial direction by the amount of the initial clearance d, as is shown in FIG. 2. At the same time, the second elastic piece 28 is deformed by being pulled in the axial direction by the amount of the initial clearance d. The result of this is that the intermediate plate 18 is pulled to the bottom surface of the electromagnet 20. Accordingly, when the electromagnet 20 is operated, elastic deformation of the first elastic piece 16 due to the load transmitted from the top plate 12 is prevented and only the second elastic piece 28 is able to be deformed.

As a result, according to the vibration isolating apparatus 10, the operation of the electromagnet 20 when shaking vibration is being input causes only the second elastic piece 28, out of the elastic pieces 16 and 28 forming the elastic body 29, to be elastically deformed by shaking vibration transmitted from the top plate 12 and to function as the main vibration absorbing body. Therefore, the static spring constants of the elastic body 29 for both the roll and the pitch transmitted from the top plate 12 can be made larger than when the electromagnet 20 is not being operated. Moreover, when the electromagnet 20 is not operated, the first elastic piece 16 and the second elastic piece 28 are both elastically deformed by the load transmitted from the top plate 12 and function as two vibration absorbing main bodies arranged serially to each other. Therefore, the static spring constants of the elastic body 29 for both the roll and the pitch transmitted from the top plate 12 can be made smaller than when the electromagnet 20 is operated.

Note that the pitch transmitted from the top plate 12 mainly acts on the elastic body 29 as a vertical load which generates deformation by compressing and deformation by pulling the elastic body 29. Note also that the roll transmitted from the top plate 12 mainly acts on the elastic body 29 as a shear load which generates deformation by shearing the elastic body 29.

Specifically, if the spring constant relative to the vertical load in the axial direction of the first elastic piece 16 is set as $K_{1P}$=20 kgf/mm, and the spring constant relative to the shear load which is orthogonal to the axial direction of the first elastic piece 16 is set as $K_{1Q}$=10 kgf/mm, and if the spring constant relative to the vertical load in the axial direction of the second elastic piece 28 is set as $K_{2P}$=20 kgf/mm, and the spring constant relative to the shear load which is orthogonal to the axial direction of the second elastic piece 28 is set as $K_{2Q}$=15 kgf/mm, then during shaking vibration generation which causes the electromagnetic 20 to be operated, the compound spring constant $K_P$ relative to the vertical load of the elastic body 29 and the compound spring constant $K_Q$ relative to the shear load of the elastic body 29 are the same as those for the second elastic piece 28, i.e. $K_P$=20 kgf/mm and $K_Q$=15 kgf/mm.

Further, during idling vibration generation which causes the electromagnet 20 to not be operated, the compound spring constant Kp relative to the vertical load of the elastic body 29 and the compound spring constant $K_Q$ relative to the shear load of the elastic body 29 have the following relationships:

$$K_P=(K_{1P} \times K_{2P})/(K_{1P}+K_{2P})=10 \text{ kgf/mm}$$

$$K_Q=(K_{1q} \times K_{2q})/(K_{1q}+K_{2q})=6 \text{ kgf/mm}$$

Accordingly, in the vibration isolating apparatus 10, when the controller 26 determines that shaking vibration is being generated and supplies drive current to the electromagnet 20, the intermediate plate 18 is attracted to the electromagnet 20, as is shown in FIG. 2. Because elastic deformation of the first elastic piece 16 due to the load transmitted from the top plate 12 is thus prevented, the static spring constants relative to the vertical load and shear load of the elastic body 29 can each be increased compared to when the electromagnet 20 is not operating. They are thus able to be adjusted to optimum values for absorbing shaking vibration. As a result, shaking vibration input from the top plate 12 can be efficiently absorbed by the internal friction in the elastic body 29 (the second elastic piece 28).

Furthermore, when shaking vibration is being generated, the content volume of the pressure receiving fluid compartment 74 changes in accompaniment to the elastic deformation of the second elastic piece 28. The content volume of the fluid sub-compartment 72 also changes in accompaniment to the elastic deformation of the diaphragm 48. The fluid inside the pressure receiving fluid compartment 74 and the fluid sub-compartment 72 flows reciprocally via the restricting passage 70. The vibration energy is absorbed by damping action based on resistance to the fluid flow generated in the through holes and by the fluid resonance and the like. This enables the shaking vibration to be effectively absorbed.

In contrast to this, in the vibration isolating apparatus 10, when the controller 26 determines that idling vibration is being generated and shuts off the supply of drive current to the electromagnet 20, the intermediate plate 18 moves away from the electromagnet 20, as is shown in FIG. 1. Because elastic deformation of the first elastic piece 16 due to the load transmitted from the top plate 12 is thus made possible, the static spring constants relative to the vertical load and shear load of the elastic body 29 can each be decreased compared to when the electromagnet 20 is being operated. They are thus able to be adjusted to optimum values for absorbing idling vibration. As a result, idling vibration input from the top plate 12 can be efficiently absorbed by the internal friction in the elastic body 29 (the first elastic piece 16 and the second elastic piece 28).

Note that in the vibration isolating apparatus 10 of the present embodiment, the restricting passage 70, which connects the pressure receiving fluid compartment 74 and the fluid sub-compartment 72, has been made comparatively long and with a comparatively small cross section so as to counter the shaking vibration. Moreover, the diaphragm 48 was given a comparatively high rigidity. However, if the length and area of the cross section of the restricting passage 70 as well as the rigidity of the diaphragm 48 are set at sizes designed to counter idling vibration, then idling vibration can be more effectively absorbed by the fluid flow resistance, the fluid resonance, and the like.

Furthermore, in the vibration isolating apparatus 10 of the present embodiment, the elastic body 29 was constructed with the first elastic piece 16 and the second elastic piece 28 formed completely separate from each other. However, the first elastic piece 16 and the second elastic piece 28 may be partially bonded to each other. Moreover, by altering the cross-sectional area of the bonding portions, it is possible to adjust the amount of the change in the static spring constant between when the electromagnet 20 is being operated and when it is not being operated. Further, by adjusting the thickness of each of the elastic pieces 16 and 28 in the axial direction, it becomes possible to adjust the amount of the change in the static spring constant between when the electromagnet 20 is being operated and when it is not being operated.

Further, in the present embodiment, the movement of the intermediate plate 18 relative to the top plate 12 is restrained by the electromagnet 20. However, the means for restraining the top plate 12 is not limited to the electromagnet 20, and a further example of a restraining means is one in which negative pressure is supplied from the outside to the interior of the hollow portion 17 inside the first elastic piece 16, thereby causing the first elastic piece 16 to be deformed by compression. The intermediate plate 18 is made to adhere tightly to a rigid block body formed with substantially the same shape as the electromagnet 20. The intermediate plate 18 may also be restrained or released using a connecting member such as a wire or a link which is connected to the intermediate plate 18.

(Second Embodiment)

Figure 3:
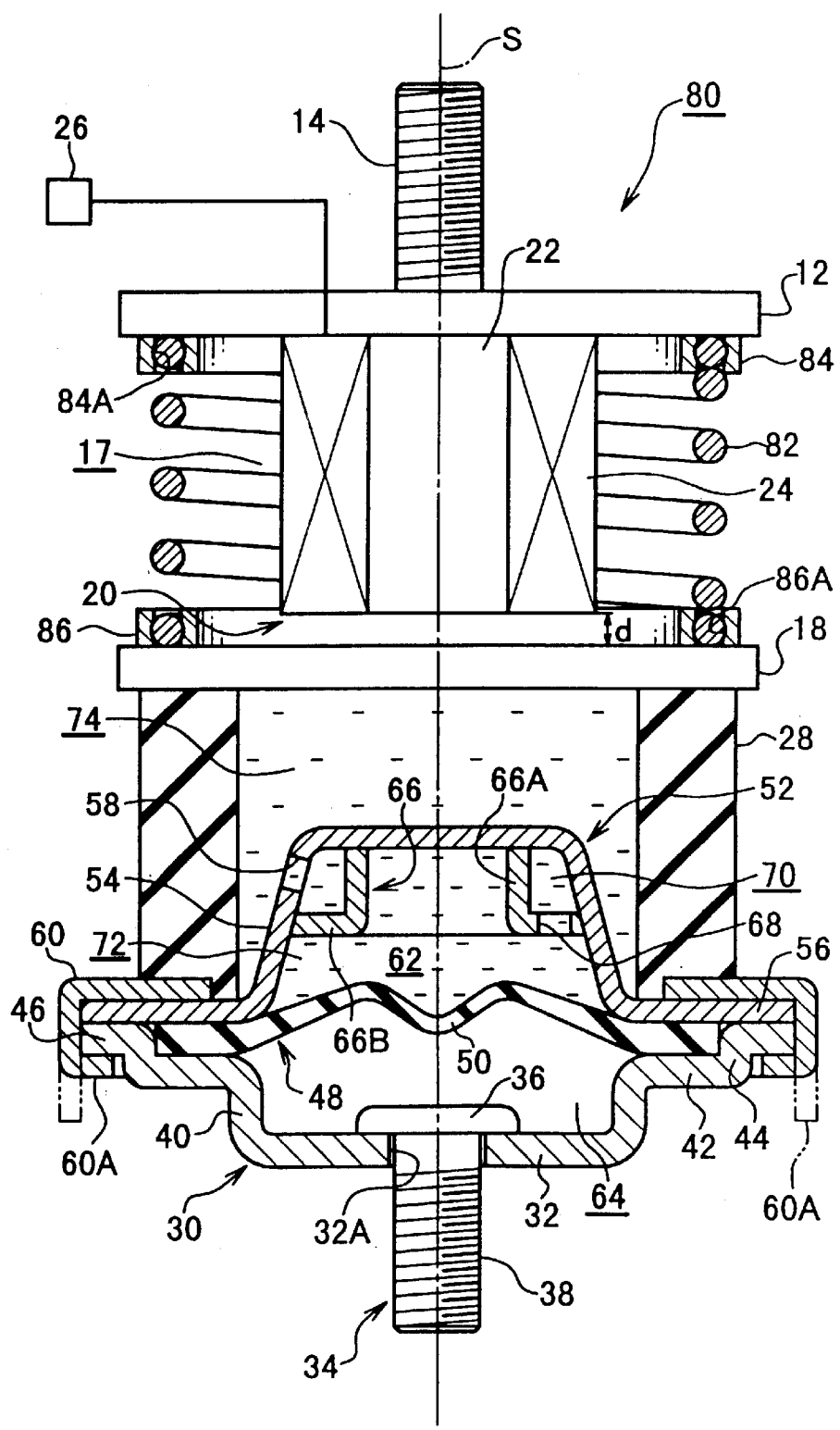
FIG. 3 is a cross sectional view along an axial direction showing a state in which an electromagnet in the vibration isolating apparatus according to the second embodiment of the present invention is not being operated.
Figure 4:
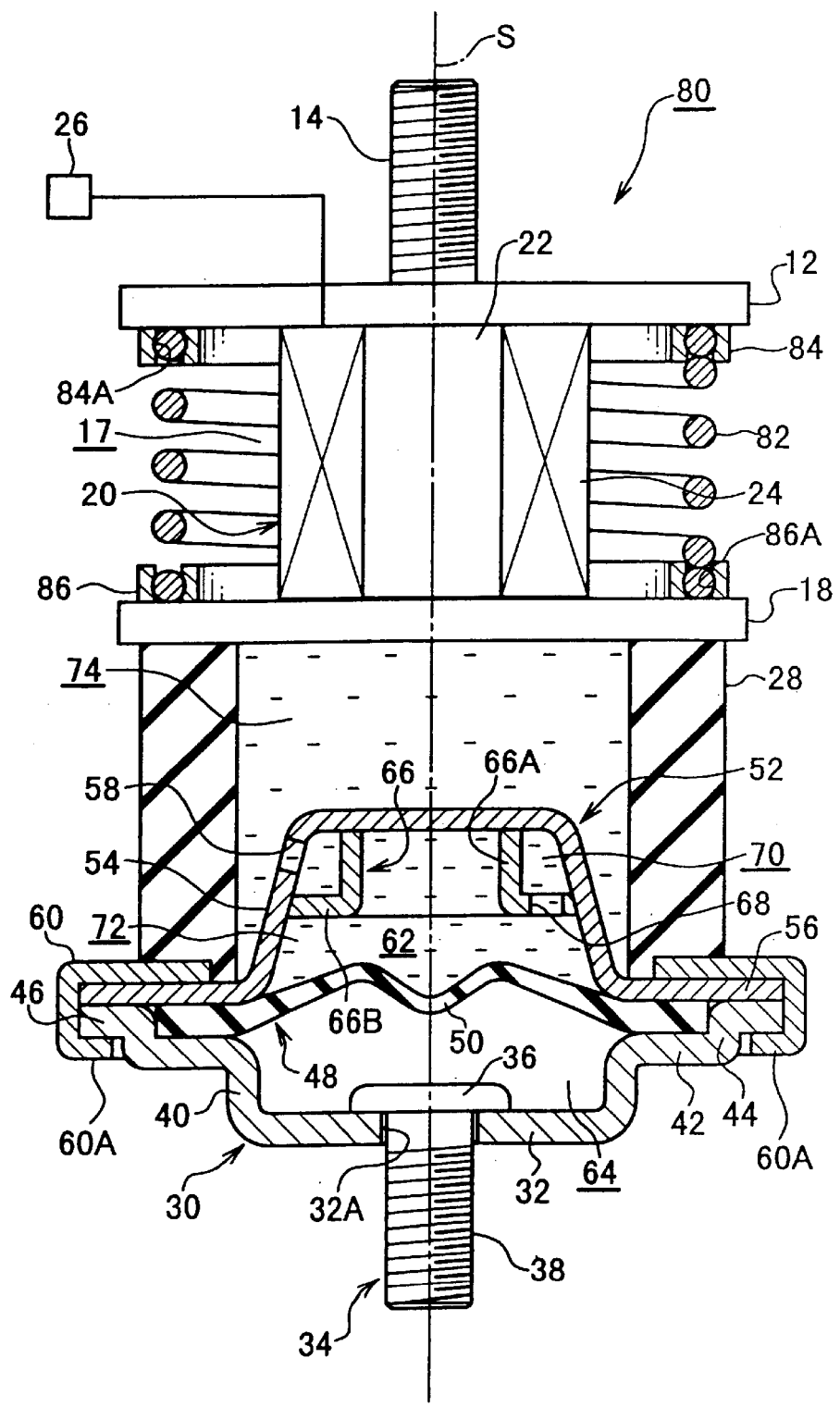
FIG. 4 is a cross sectional view along an axial direction showing a state in which an electromagnet in the vibration isolating apparatus according to the second embodiment of the present invention is being operated.

A vibration isolating apparatus according to the second embodiment of the present invention is shown in FIGS. 3 and 4. Note that the same symbols are allocated to members whose structure and operation are the same as in the vibration isolating apparatus according to the first embodiment, and an explanation thereof is omitted.

The vibration isolating device 80 differs from the vibration isolating device 10 in that a metal coil spring 82 is provided between the top plate 12 and the intermediate plate 18 instead of the first elastic piece 18. Apart from this, the rest of the structure is the same as in the vibration isolating apparatus 10. The coil spring 82 is disposed so that the central axis thereof matches the axial center S. The top end portion of the coil spring 82 in the axial direction abuts the bottom surface of the top plate 12. The bottom end portion of the coil spring 82 abuts the top surface of the intermediate plate 18.

A ring shaped insert fixing portion 84 is provided integrally with the bottom surface of the top plate 12 centered around the axial center S. A circular groove 84A is formed running in a peripheral direction in the bottom surface of the insert fixing portion 84. A ring shaped insert fixing portion 86 is also provided integrally with the top surface of the intermediate plate 18 centered around the axial center S. A circular groove 86A is formed running in a peripheral direction in the top surface of the insert fixing portion 86.

The top end portion of the coil spring 82 is inserted inside the groove 84A of the insert fixing portion 84, thereby fixing the coil spring 82 to the top plate 12. The bottom end portion of the coil spring 82 is inserted in the groove 86A of the insert fixing portion 86, thereby fixing the coil spring 12 to the intermediate plate 18.

When no vibration from the outside is being input into the coil spring 12 of the present embodiment (the state shown in FIG. 3), a gap between the bottom surface of the electromagnet 20 and the top surface of the intermediate plate 18 is provided as the initial clearance d, in the same way as in the vibration isolating apparatus 10.

If the controller 26 determines that idling vibration is being generated in which the vibration from the engine is in a comparatively high frequency range, the supply of drive current to the electromagnet 20 is shut off. In this case, the gap between the bottom surface of the electromagnet 20 and the top surface of the intermediate plate 18 is set to the initial clearance d when the initial load generated by the weight of the engine itself and so on is received. Accordingly, when the electromagnet 20 is not being operated, elastic deformation of both the coil spring 82 and the second elastic piece 28 by the load transmitted from the top plate 12 becomes possible.

Furthermore, if the controller 26 determines that shaking vibration is being generated in which the vibration from the engine is in a comparatively low frequency range, drive current is supplied to the coil 24 of the electromagnet 20. The electromagnet 20 then generates magnetic force and the coils spring 82 is deformed by being compressed in the axial direction by the amount of the initial clearance d, as is shown in FIG. 4. At the same time, the second elastic piece 28 is deformed by being pulled in the axial direction by the amount of the initial clearance d. The result of this is that the intermediate plate 18 is pulled to the bottom surface of the electromagnet 20. Accordingly, when the electromagnet 20 is operated, elastic deformation of the coil spring 82 due to the load transmitted from the top plate 12 is prevented and only the second elastic piece 28 is able to be deformed.

As a result, according to the vibration isolating apparatus 80, the operation of the electromagnet 20 when shaking vibration is being input causes only the second elastic piece 28, out of the coil spring 82 and the elastic piece 28, to be elastically deformed by shaking vibration transmitted from the top plate 12 and to function as the main vibration absorbing body. Therefore, the static spring constants for both the roll and the pitch transmitted from the top plate 12 can be made larger than when the electromagnet 20 is stopped. Moreover, when the electromagnet 20 is stopped, the coil spring 82 and the second elastic piece 28 are both elastically deformed by the load transmitted from the top plate 12 and function as two vibration absorbing main bodies arranged serially to each other. Therefore, the static spring constants for both the roll and the pitch transmitted from the top plate 12 can be made smaller than when the electromagnet 20 is operated.

The spring constant $K_{1P}$ relative to the vertical load and the spring constant $K_{1Q}$ relative to the shear load for the coil spring 82 of the vibration isolating apparatus 80 are both set at the same size as the spring constants $K_{1P}$ and $K_{1Q}$ for the first elastic piece 18 in the first embodiment. As a result, in the vibration isolating apparatus 80 of the present embodiment, during shaking vibration generation, the compound spring constant $K_P$ relative to the vertical load and the compound spring constant $K_Q$ relative to the shear load are the same size as the compound spring constants $K_P$ and $K_Q$ of the vibration isolating apparatus 10. Moreover, during idling vibration generation, the compound spring constant $K_P$ relative to the vertical load and the compound spring constant $K_Q$ relative to the shear load are also the same size as the compound spring constants $K_P$ and $K_Q$ of the vibration isolating apparatus 10.

The operation of the vibration isolating apparatus 80 according to the present embodiment will now be explained.

In the vibration isolating apparatus 80 according to the present embodiment, the controller 26 determines that shake vibration is being generated and supplies drive current to the electromagnet 20. As is shown in FIG. 4, this causes the intermediate plate 18 to be attracted to the electromagnet 20. Because elastic deformation of the coil spring 82 caused by the load transmitted from the top plate 12 is prevented, the static spring constants relative to the vertical load and shear load can both be made larger than when the electromagnet 20 is not being operated and can both be adjusted to optimum values for absorbing the shake vibration. As a result, shake vibration input from the top plate 12 can be efficiently absorbed by internal friction in the second elastic piece 28.

Furthermore, when shaking vibration is being generated, the content volume of the pressure receiving fluid compartment 74 changes in accompaniment to the elastic deformation of the second elastic piece 28. The content volume of the fluid sub-compartment 72 also changes in accompaniment to the elastic deformation of the diaphragm 48. The fluid inside the pressure receiving fluid compartment 74 and the fluid sub-compartment 72 flows reciprocally via the restricting passage 70. The vibration energy is absorbed by damping action based on resistance to the fluid flow generated in the through holes and by the fluid resonance and the like. This enables the shaking vibration to be effectively absorbed.

In contrast to this, in the vibration isolating apparatus 80, when the controller 26 determines that idling vibration is being generated and shuts off the supply of drive current to the electromagnet 20, the intermediate plate 18 moves away from the electromagnet 20, as is shown in FIG. 3. Because elastic deformation of the coil spring 82 caused by the load transmitted from the top plate 12 is thus made possible, the static spring constants relative to the vertical load and shear load can each be decreased compared to when the electromagnet 20 is being operated. They are thus able to be adjusted to optimum values for absorbing idling vibration. As a result, idling vibration input from the top plate 12 can be efficiently absorbed by the vibration damping action of the coil spring 82 and the internal friction in the second elastic piece 28.

Furthermore, in the vibration isolating apparatus 80 of the present embodiment, a metal coil spring 82 was used as the elastic member provided between the top plate 12 and the intermediate plate 18 which gave the spring excellent heat resistance. Therefore, deterioration due to the heat generated by long use in high temperature conditions can be suppressed. As a result, performance losses such as a lowering of the spring constant or changes in the free length caused by heat deterioration of the coil spring 82 can be prevented over the long term. However, although a metal spring tends to corrode more easily due to environmental conditions than a rubber elastic member, performance loss due to rust and the like can be prevented in the long term by performing an anti-rust treatment on the coil spring such as galvanizing the surface or applying a cation coating thereto.

According to the vibration isolating apparatus of the present invention, the static spring constant of an elastic body to counter vertical load and the static spring constant of an elastic body to counter shear load can both be adjusted to optimum values in accordance with the characteristics of the input vibration.

What is claimed is:

1. A vibration isolating apparatus comprising:

a first mounting member connected to a vibration generating portion;

a second mounting member connected to a vibration receiving portion;

an elastic body capable of elastic deformation which is provided between the first mounting member and the second mounting member;

an intermediate plate for partitioning the elastic body into a first elastic piece at the side of the first mounting member and a second elastic piece at the side of the second mounting member cross-sectionally relative to a vertical load from the first mounting member or second mounting member;

restraining means provided together with the first elastic piece between the first mounting member and the intermediate plate, which restrains movement of the intermediate plate relative to the first mounting means when operated, and allows movement of the intermediate plate relative to the first mounting means when not operated;

a diaphragm provided between the second mounting member and the second elastic piece;

a partition wall portion provided inside a space defined by the intermediate plate, the second elastic piece and the diaphragm, such that the partition wall portion divides the space into a pressure receiving fluid compartment at the side of the intermediate plate and a fluid compartment at the side of the diaphragm, the pressure receiving fluid compartment communicating with the fluid compartment by way of an orifice formed in the partition wall portion, wherein the content volume of the pressure receiving fluid compartment is changed by elastic deformation of the second elastic piece; and a passage forming member provided inside the fluid compartment, such that the passage forming member divides the fluid compartment into a ring-shaped restricting passage and a fluid sub-compartment as the remaining space of the fluid compartment, the restricting passage communicating with the fluid sub-compartment by way of an orifice formed in passage forming member.

2. The vibration isolating apparatus according to claim 1, wherein the restraining means has an electromagnet which is fixed to one of the first mounting member and the intermediate plate and, when drive current is supplied to the electromagnet, the electromagnet attracts the other one of the first mounting member and intermediate plate which are formed from a magnetic substance.

3. The vibration isolating apparatus according to claim 2, wherein the restraining means is fixed to one of the first mounting member and the intermediate plate, and is press-contacted to the other one of the first mounting member and the intermediate plate when in operation and separated from the other one of the first mounting member and the intermediate plate when not in operation so as to form a clearance larger than the amplitude of the idling vibration of the vehicle.

4. The vibration isolating apparatus according to claim 2, wherein the first elastic piece is a rubber elastic body.

5. The vibration isolating apparatus according to claim 3, wherein the first elastic piece is a metal spring.

* * * * *